United States Patent [19]
Sien

[11] 3,908,778
[45] Sept. 30, 1975

[54] DIESEL TRACTOR FOR ARTICULATED MINE VEHICLES

[75] Inventor: Gerald Bruce Sien, Carlsbad, N. Mex.

[73] Assignee: Sien Equipment Company, Carlsbad, N. Mex.

[22] Filed: Oct. 5, 1973

[21] Appl. No.: 404,098

[52] U.S. Cl. ......... 180/77 MC; 280/106 R; 180/12; 180/64 A
[51] Int. Cl.² ......................................... B60K 5/02
[58] Field of Search......... 280/106 R, 91; 180/64 A, 180/77 MC, 29, 11, 12, 77 S

[56] References Cited
UNITED STATES PATENTS

| | | | |
|---|---|---|---|
| 1,435,354 | 11/1922 | Weaver | 280/106 R |
| 2,226,027 | 12/1940 | Stoner | 180/77 S |
| 2,298,448 | 10/1942 | Arentzen | 180/77 S |
| 2,325,731 | 8/1943 | Arentzen et al. | 180/77 MC |
| 2,590,300 | 3/1952 | Dudley | 280/91 |
| 3,085,644 | 4/1963 | Van Der Lely | 180/77 S |
| 3,088,749 | 5/1963 | Schilberg | 280/106 R |
| 3,262,513 | 7/1966 | Henriksson et al. | 180/29 |
| 3,630,302 | 12/1971 | Holland | 180/12 |

*Primary Examiner*—Kenneth H. Betts
*Assistant Examiner*—Jack D. Rubenstein
*Attorney, Agent, or Firm*—Richards, Harris & Medlock

[57] ABSTRACT

A diesel tractor for articulated mine vehicles comprises a frame including parallel rectangular tubular members interconnected at their extreme front ends by a transverse rectangular tubular member and extending to inverted U-shaped portions. A diesel engine is mounted at the front end of the frame between the parallel members and drives a power shift transmission which in turn drives a differential. The differential includes axles which extend outwardly through the inverted U-shaped portions of the frame to a pair of planetary hubs. Tires are mounted on the planetary hub and function as the sole support for the tractor. The frame further includes a grille and a pair of side portions extending outwardly from the parallel portions of the frame in front of the tires. One of the side portions supports a fuel tank and an air cleaner for the diesel engine, and the other side portion supports an oxy-catalyst scrubber which receives the exhaust of the diesel engine. The parallel members of the frame extend rearwardly from the differential for connection to a trailer by means of an articulated joint. An operator's compartment is mounted between the parallel members of the frame behind the differential and includes a laterally facing seat which facilitates concurrent observation of the diesel tractor and the trailer. All of the operating components of the diesel tractor are positioned beneath a normally horizontally disposed plane extending tangent to the tops of the tires.

10 Claims, 4 Drawing Figures

DIESEL TRACTOR FOR ARTICULATED MINE VEHICLES

BACKGROUND AND SUMMARY OF THE INVENTION

This invention relates to a diesel tractor for articulated mine vehicles.

Over the years a number of criteria have been established in the design of vehicles intended for use in mines and similar environments. First, it is necessary that such vehicles be highly maneuverable. This is because mine vehicles are often required to operate in extremely cramped quarters and to maneuver around corners characterized by extremely small radii. Second, in many instances mine vehicles must have a minimum overall height. This is because mine tunnels, etc. are often characterized by reduced vertical dimensions. Third, the prime mover of a mine vehicle must be such that no significant fire hazard is encountered due to the operation of the vehicle. Moreover, the prime mover of the vehicle must be of such a nature that the operation of the vehicle does not contaminate the mine atmosphere with dangerous gases.

In view of the foregoing requirements, the articulated vehicle design concept has gained increased acceptance in the construction of mine vehicles. As is well known, an articulated vehicle typically comprises a forward tractor portion and a rearward trailer portion which are interconnected by an articulated joint. The tractor and trailer portions of the vehicle are each provided with at least one set of non-steerable support wheels, and steering of the vehicle is effected by manipulation of the articulated joint. By this means the mine vehicle may be extremely rugged in construction while simultaneously being highly maneuverable in operation.

Heretofore the tractor portion of many articulated mine vehicles has been electrically powered. This has proven to be unsatisfactory from a number of standpoints. First, the batteries which are required for the operation of such a vehicle are extremely heavy, and therefore must be manipulated onto and off the vehicle by means of a crane or similar apparatus. Second, the batteries which are utilized in electrically powered articulated mine vehicles are incapable of operating for a period of longer than about five hours. Since the working shift for mine employees is typically 6 hours, this factor results in a considerable loss of man hours during each shift. Third, due to loss of power in the batteries, articulated mine vehicles of the electric type are capable of making only about 40 to 50 trips during a 6 hour shift. A related problem involves the fact that due to loss of power in the batteries, the vehicle cannot be operated at full power at the end of the shift.

In accordance with the present invention, the foregoing problems are overcome by the use of a diesel engine as the prime mover in the tractor of an articulated mine vehicle. This has been found to be advantageous from a number of standpoints. For example, the necessity of changing and recharging batteries is completely eliminated. Moreover, it has been found that the diesel powered tractor is capable of operating an articulated mine vehicle through approximately 60 to 70 trips during a 6 hour shift. This is because since there is no loss of operating power in the diesel engine during the shift, the tractor is capable of operating at full power throughout the entire shift.

In accordance with the broader aspects of the invention, a diesel tractor for articulated mine vehicles comprises a frame including parallel rectangular tubular members interconnected at their extreme front ends by a transverse rectangular tubular member. A diesel engine is mounted on the frame between the forward portions of the parallel members. The engine drives a power shift transmission which in turn drives a differential. The differential includes axles which extend outwardly through inverted U-shaped portions of the frame to planetary hubs. Tires are mounted on the planetary hubs and function as the sole support for the tractor. All of the components of the tractor are disposed beneath a normally horizontal plane extending tangent to the tops of the tires.

In accordance with more specific aspects of the invention, the parallel rectangular tubular members of the frame comprise forward portions having reduced vertical dimensions and rearward portions having increased vertical dimensions. A grille is mounted at the front end of the frame and serves to protect a radiator of the engine. The frame further includes side portions extending outwardly from the parallel rectangular tubular portions and positioned in front of the tires. One of the side portions of the frame supports a fuel tank and an air cleaner for the engine. The other side portion supports an oxy-catalyst scrubber which functions to remove harmful components of the exhaust gases flowing from the engine.

In accordance with still other aspects of the invention, an operator's compartment is disposed between the parallel, rectangular tubular members of the frame behind the differential. The operator's compartment includes a laterally facing seat. By this means concurrent observation of the operation of the tractor and of the operation of the trailer connected to the tractor is facilitated.

DESCRIPTION OF THE DRAWINGS

A more complete understanding of the invention may be had by reference to the following Detailed description when taken in conjunction with the accompanying Drawings, wherein.

DETAILED DESCRIPTION

Figure 4:
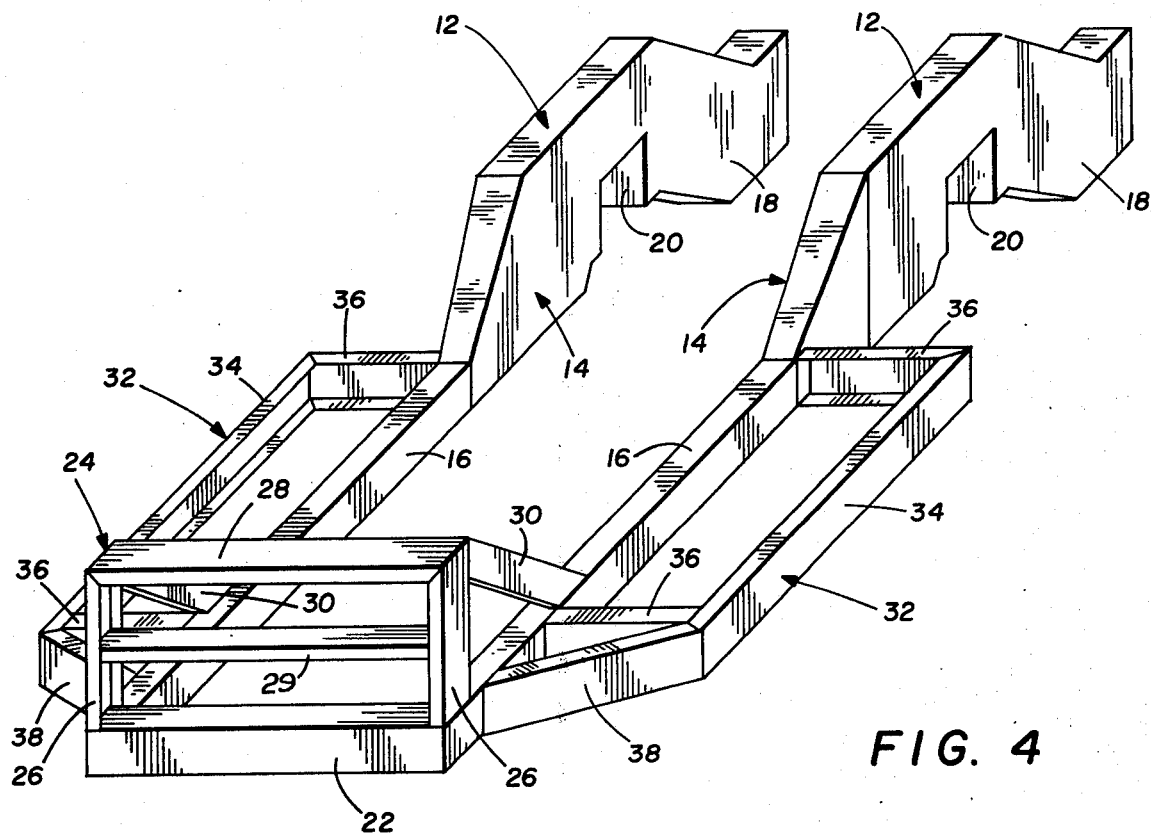
FIG. 4 is a perspective view of the frame of the diesel tractor illustrated in FIG. 1.

Referring now to the Drawings, there is shown a diesel tractor for articulated mine vehicles and which incorporates the present invention. Referring particularly to FIG. 4, the tractor 10 includes a frame 12 comprising parallel, longitudinally disposed rectangular tubular members 14. The members 14 each comprise a forward portion 16 characterized by a relatively reduced vertical dimension and a rearward portion 18 characterized by a relatively increased vertical dimension. The rearward portion 18 of each rectangular tubular member 14 is further characterized by an inverted U-shaped portion 20.

The extreme front ends of the parallel rectangular tubular members 14 of the frame 12 are interconnected by a transverse rectangular tubular member 22. All of the rectangular tubular members utilized in the frame 12 are preferably fabricated from ¾ inch Tryten steel. The tubular members may be fabricated by cutting the necessary shapes from flat steel stock by means of flame cutting, and then joining the flat plates into the necessary rectangular tubular shapes by means of welding.

The forward portion of the frame 12 further comprises a grille 24. The grille 24 includes a pair of channel members 26 which extend upwardly from the intersections of the parallel rectangular tubular members 14 and the transverse rectangular tubular member 22. A channel member 28 extends between the upper ends of the upright channel members 26, and a channel member 29 extends between the channel members 26 at a point disposed approximately midway between the transverse rectangular tubular member 22 and the channel member 28. The grille 24 is completed by means of a pair of brace members 30 each extending angularly between the upper end of one of the channel members 26 and the adjacent rectangular tubular member 14 of the frame 12.

The frame 12 of the diesel shuttle car tractor for use in mines 10 is completed by a pair of side portions 32. The side portions 32 extend outwardly from the parallel rectangular tubular members 14 at points located forwardly of the rear portions 18 thereof. The side portions 32 are each formed from steel channel stock and each comprise a main beam 34 extending parallel to the adjacent rectangular tubular member 14, a pair of end beams 36 interconnecting the beam 34 and the rectangular tubular member 14, and a brace beam 38 extending angularly between the forward end of the main beam 34 and the adjacent rectangular tubular member 14.

Figure 1:
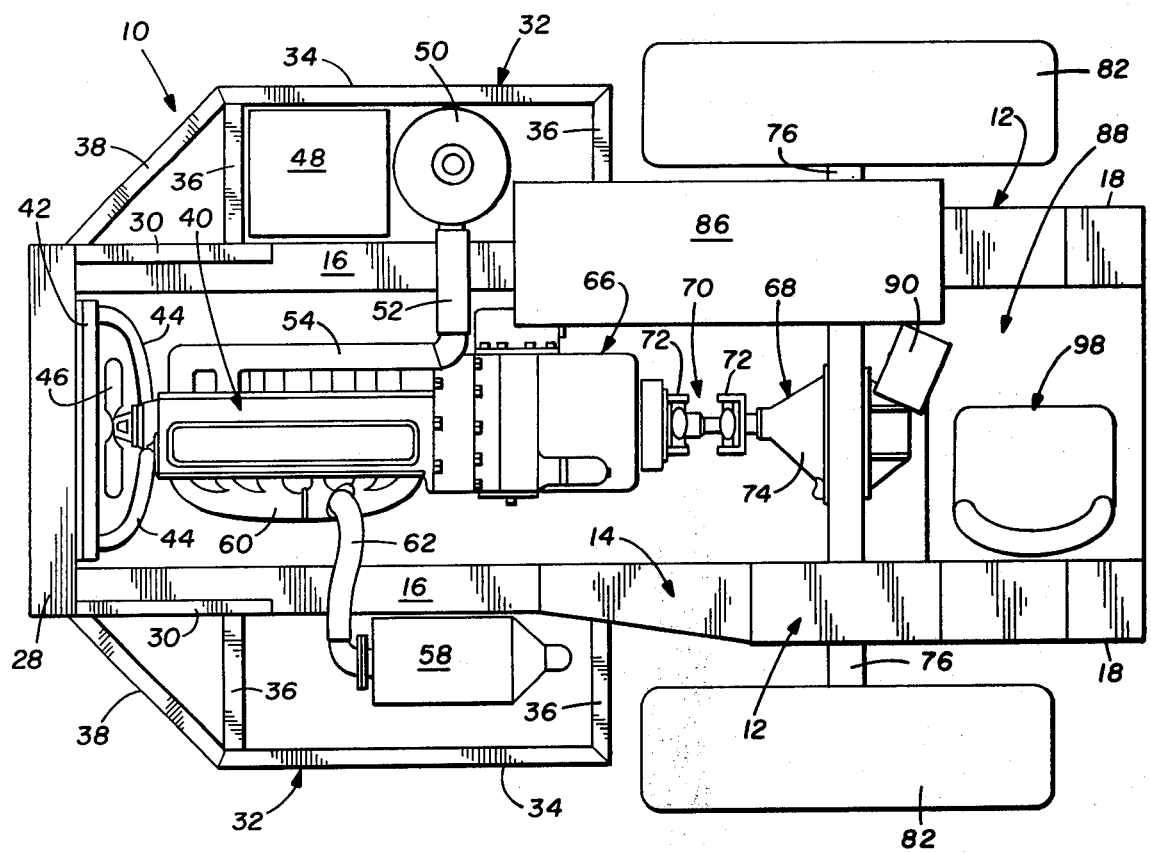
FIG. 1 is a top view of a diesel tractor for articulated mine vehicles incorporating the invention.

Referring now to FIG. 1, the diesel tractor for articulated mine vehicles 10 further comprises a diesel engine 40 which is supported on the frame 12 between the forward portion 16 of the parallel rectangular tubular members 14. The diesel engine 40 is of the liquid cooled variety and is provided with a radiator 42 mounted on the frame 12 just behind the grille 24. The radiator 42 is connected to the remaining components of the diesel engine 40 by means of suitable fan 46. A fan 46 is provided for use in forcing cooling air through the radiator 42. A suitable engine for use in the diesel shuttle car tractor for use in mines 10 comprises the 401 cubic inch, 132 horsepower diesel engine manufactured by the Ford Motor Company of Dearborn, Michigan.

Fuel for operating the diesel engine 40 is supplied from a fuel tank 48 which is mounted on one of the side portions 32 of the frame 12. The same side portion 32 supports an air cleaner 50. Operating air for the engine 40 is thus received through the air cleaner 50, an air passageway 52 extending from the air cleaner 50, and an intake manifold 54 connected to the passageway 52.

The opposite side portion 32 of the frame 12 supports an oxy-catalyst scrubber 58. Those skilled in the art will appreciate the fact that such a device is required in diesel equipment to be utilized in mines in accordance with the regulations of United States Bureau of Mines Schedule 24. Exhaust gases flowing from the diesel engine 40 are accumulated in an exhaust manifold 60 and are directed therefrom through an exhaust passageway 62 into the oxy-catalyst scrubber 58. The oxy-catalyst scrubber 58 in turn directs the exhaust gases into the atmosphere through a suitable diffuser (not shown).

The output of the diesel engine 40 is coupled to a transmission 66. The transmission 66 preferably comprises a power shift transmission of the type adapted for four-speed operation in both the forward and reverse directions. However, for mine usage the highest (lowest numerical) gear ratio of the transmission is preferably blocked out. A suitable transmission for use in the tractor 10 comprises the transmission manufactured by the Funk Manufacturing Company of Coffeyville, Kansas, and sold by that company under Model Number 1014.

The output of the transmission 66 is coupled to a differential 68 by means of a drive shaft assembly 70 comprising a pair of universal joints 72. A suitable drive shaft assembly for use in the diesel shuttle car tractor for use in mines 10 comprises a 17,000 pound capacity drive shaft assembly of the type manufactured by the Spicer Universal Joint Division, Dana Corporation, of Toledo, Ohio.

The differential 68 comprises a central portion 74 mounted between the parallel tubular members of the frame 12 and a pair of axles extending outwardly through a pair of axle housings 76. The axle housings 76 extend through the inverted U-shaped portions 20 of the rear portions 18 of the frame 12. A suitable differential and axle assembly for use in the diesel tractor 10 is manufactured and sold by the North American Rockwell Corporation of Pittsburg, Pennsylvania, under Model Number PR352, and is characterized by an 84,000 pound capacity.

Figure 2:
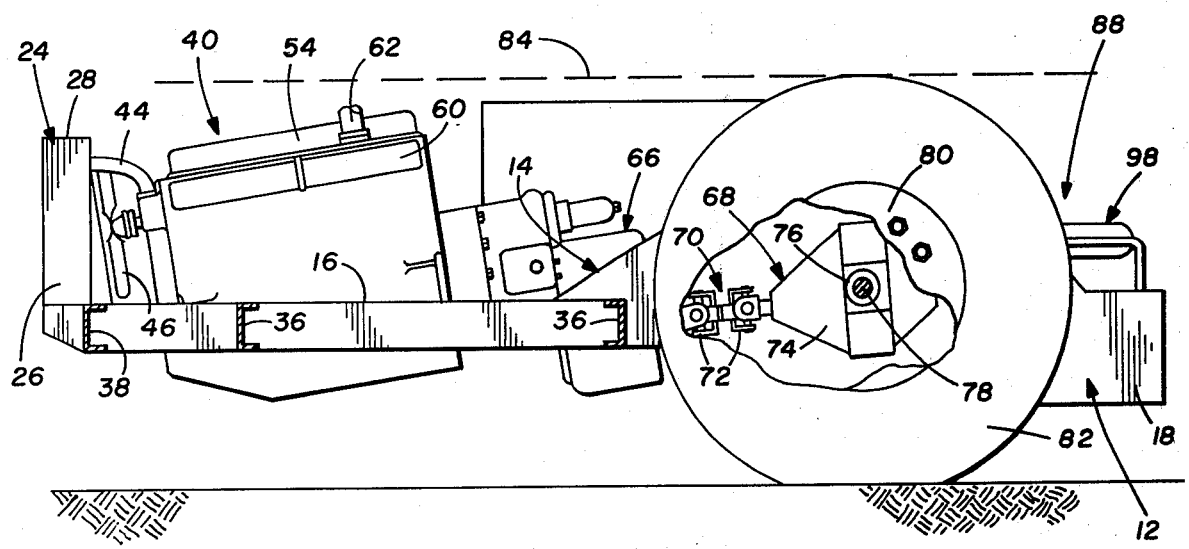
FIG. 2 is a side view of the diesel tractor in which certain components have been broken away more clearly to illustrate certain features of the invention.

Referring now to FIG. 2, the differential 68 of the diesel tractor for articulated mine vehicles 10 comprises a pair of axles 78 which extend through the axle housing 76. The axles 78 extend to a pair of opposed planetary hubs 80 which in turn support a pair of tires 82. Two very important features of the tractor 10 are related to the tires 82. First, the tires 82 comprise the sole support for the tractor 10. Second, all of the component parts of the tractor 10 are located substantially beneath a normally horizontally disposed plane 84 extending tangent to the tops of the tires 82. Those skilled in the art will appreciate the fact that this is highly important in that it facilitates the use of the tractor 10 in numerous mine environments characterized by extremely small vertical dimensions.

Referring again to FIG. 1, the tractor 10 further includes a hydraulic fluid reservoir 86 positioned over one of the tubular members 14 and substantially above the rear portion 18 thereof. An operator's compartment 88 is mounted between the parallel tubular members 14 of the frame 12 and behind the differential 68. The operator's compartment 88 includes a dashboard 90 and an operator seat 92. The seat 92 faces laterally so as to facilitate concurrent observation of the operation of the tractor 10 and a trailer connected thereto.

Figure 3:
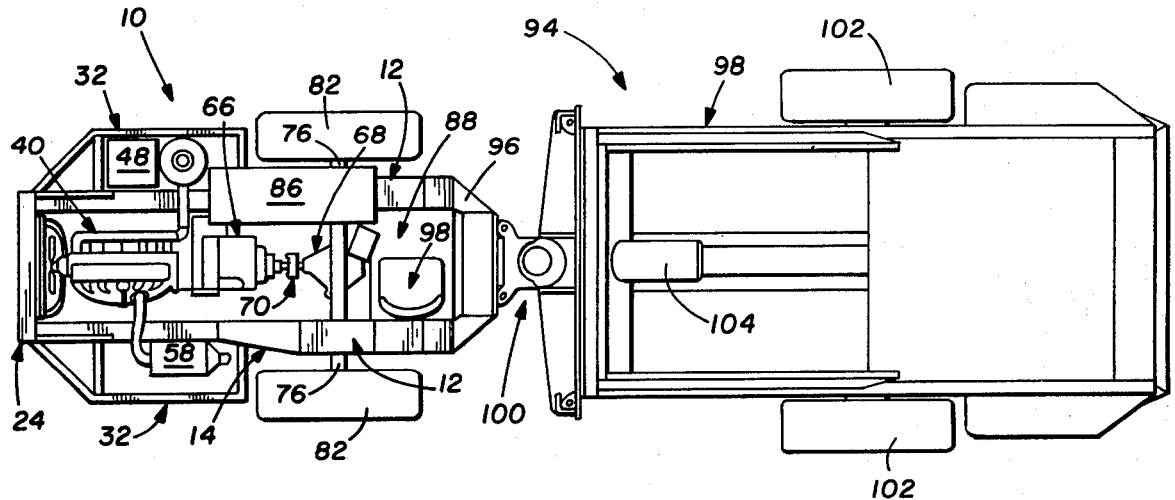
FIG. 3 is a reduced top view illustrating the diesel tractor connected to a telescoping trailer.

Referring now to FIG. 3, the diesel tractor 10 is shown connected to a telescoping trailer 94 of the type manufactured and sold by the Jeffery Mining Machinery Company, Division of Jeffery Galion, Inc., of Columbus, Ohio. Such a trailer includes a forward portion 96 which is adapted for connection to the tractor 10 by means of welding. The forward portion 96 is connected to a rear portion 98 by means of an articulated joint 100. As will be understood by those skilled in the art, the joint 100 is also utilized to effect steering of the overall vehicle comprising the tractor 10 and the trailer 94.

The rear portion 98 of the trailer 94 comprises a telescoping chassis supported on a pair of opposed wheels 102. A hydraulic cylinder 104 is provided for use in selectively extending or retracting the telescoping body of the trailer 94. Pressurized hydraulic fluid for use in selectively extending or retracting the telescoping body under the action of the cylinder 104 is supplied from the diesel tractor 10. Those skilled in the art will appreciate the fact that the tractor 10 is also readily adapted for use in conjunction with other types of trailers.

It will be appreciated that in addition to propelling the tractor 10 and the trailer 94 connected thereto, the diesel engine 40 operates hydraulic pumps which receive hydraulic fluid from the reservoir 86 and supply pressure hydraulic fluid to various operating components of the tractor and the trailer. Thus, hydraulic cylinders connected between the tractor and the trailer are utilized to manipulate the articulated joint and thereby effect steering of the vehicle. Pressurized hydraulic fluid provided by the pumps driven by the diesel engine 40 is also utilized to operate the cylinder 104 and other operating components of the trailer 94.

From the foregoing, it will be understood that the present invention comprises a diesel tractor for articulated mine vehicles which incorporates numerous advantages over the prior art. Perhaps most importantly, by means of the invention there is provided a tractor which has proven to be highly reliable and adapted for long term service without breakdowns of any major sort. Another advantage deriving from the invention relates to the fact that a diesel tractor incorporating the invention may be used in conjunction with various types of commercially available trailers. Still another advantage deriving from the use of the invention relates to the fact that diesel tractors incorporating the invention are characterized by a minimal overall height, and thereby are readily adapted for use in various mine environments which may have minimal vertical dimensions.

Although specific embodiments of the present invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A diesel tractor for articulated mine vehicles which comprises:
    a frame including spaced, parallel rectangular tubular members interconnected at their extreme front ends by a transverse member and extending rearwardly to inverted U-shaped portions;
    a diesel engine mounted on the frame just behind the transverse member and between the rectangular tubular members;
    a power shift transmission mounted on the frame behind the engine and between the rectangular tubular members;
    a differential mounted on the frame behind the power shift transmission and between the rectangular tubular members and including axles extending outwardly through the inverted U-shaped portions of the tubular members of the frame;
    planetary hub means mounted on the axles and positioned outside of the rectangular tubular members of the frame;
    tire means mounted on the planetary hub means and comprising the sole support for the diesel shuttle car tractor; and
    an operator's compartment extending between the rectangular tubular members of the frame and positioned behind the differential;
    said rectangular tubular members of the frame extending rearwardly from said operator's compartment for connection to a trailer;
    all of the component parts of the tractor being positioned beneath a normally horizontally disposed plane extending tangent to the tops of the tire means;
    said forward portions of the tubular members of the frame comprising relatively reduced vertical dimensions and said inverted U-shaped portions and the trailer connection portions of the frame comprising substantially increased vertical dimensions.

2. The diesel tractor for articulated mine vehicles according to claim 1 wherein the frame is further characterized by side portions projecting laterally outwardly from the rectangular tubular members and extending in front of the tire means, one of said side portions supporting a fuel tank and an air cleaner for the diesel engine, and the other side portion supporting an oxycatalyst scrubber which receives the exhaust from the diesel engine.

3. The diesel tractor for articulated mine vehicles according to claim 2 wherein the frame further includes a grille for protecting the engine which comprises a pair of channel members extending upwardly from the intersections of the rectangular tubular members and the transverse member, a pair of channel members extending transversely between the upwardly extending members, and brace members extending angularly downwardly from the upper end of the vertically extending members to the rectangular tubular members of the frame.

4. The diesel tractor for articulated mine vehicles according to claim 1 wherein the operator's compartment includes an operator seat which faces laterally so as to facilitate concurrent observation of both the diesel shuttle car tractor and the trailer connected thereto.

5. A diesel tractor for articulated mine vehicles which comprises:
    a frame including spaced, parallel rectangular tubular members interconnected at their extreme front ends by a transverse rectangular tubular member and extending rearwardly to inverted U-shaped portions;
    said parallel rectangular tubular members being further characterized by forward portions having relatively reduced vertical dimensions and rearward portions including the inverted U-shaped portions and having relatively increased vertical dimensions;
    a diesel engine mounted on the frame between the forward portions of the parallel rectangular tubular members thereof;

a power shift transmission mounted on the frame behind the diesel engine and between the parallel rectangular tubular members;

a differential mounted on the frame behind the power shift transmission and between the parallel rectangular tubular members and including axles extending outwardly through the inverted U-shaped portions of the parallel rectangular tubular members of the frame;

planetary hub means mounted on the axles and positioned outside the parallel rectangular tubular members of the frame;

tire means mounted on the planetary hub means and comprising the sole support for the diesel tractor; and an operator's compartment extending between the parallel rectangular tubular members of the frame and positioned behind the differential;

said parallel rectangular tubular members of the frame extending rearwardly from said operator's compartment for connection to a trailer;

all of the components of the diesel tractor being positioned beneath a normally horizontally disposed plane extending tangential to the tops of the tire means.

6. The diesel tractor for articulated mine vehicles according to claim 5 wherein the frame further comprises opposed side portions each extending laterally outwardly from one of the parallel rectangular tubular members and positioned in front of the tire means, one of said side portions supporting a fuel tank and an air cleaner for the diesel engine, and the other side portion supporting an oxy-catalyst scrubber which receives the exhaust from the diesel engine.

7. The diesel tractor for articulated mine vehicles according to claim 5 wherein the frame further includes a grille comprising a pair of channel members extending upwardly from the intersections of the parallel rectangular tubular members and the transverse rectangular tubular member of the frame, a channel member extending between the upper ends of the upwardly extending channel members, and brace members extending angularly between the upper ends of the upwardly extending channel members and the parallel rectangular tubular members of the frame.

8. The diesel tractor for articulated mine vehicles according to claim 5 wherein the operator's compartment is further characterized by a laterally facing operator's seat positioned to facilitate concurrent observation of the operation of the diesel tractor and a trailer connected thereto.

9. A diesel tractor for articulated mine vehicles which comprises:

a frame including spaced, parallel rectangular tubular members interconnected at their extreme front ends by a transverse rectangular tubular member and extending rearwardly to inverted U-shaped portions;

said parallel rectangular tubular members including forward portions characterized by relatively reduced vertical dimensions and rearward portions including the inverted U-shaped portions characterized by relatively increased vertical dimensions;

said frame further including side portions extending outwardly from the forward portions of the parallel rectangular tubular members of the frame;

a grille mounted at the extreme front end of the frame and comprising upright channel members interconnected at their upper ends by a transverse channel member and brace members extending angularly downwardly from the upper ends of the upright members to the parallel rectangular tubular members of the frame;

a diesel engine mounted on the frame beween the forward portions of the parallel rectangular tubular members;

one of said side portions of the frame supporting a fuel tank and an air cleaner for the diesel engine, and the other side portion supporting an oxy-catalyst scrubber for receiving the exhaust from the diesel engine;

a power shift transmission mounted on the frame between the parallel rectangular tubular members and behind the engine;

a differential mounted on the frame behind the power shift transmission and between the parallel rectangular tubular members;

said differential including axles extending outwardly through the inverted U-shaped portions of the parallel rectangular tubular members of the frame;

planetary hub means mounted on the axles and positioned outside the parallel rectangular tubular members of the frame;

tire means mounted on the planetary hub means and comprising the sole support for the diesel tractor; and an operator's compartment extending between the parallel rectangular tubular members of the frame and positioned behind the differential;

said parallel rectangular tubular members of the frame extending rearwardly from said operator's compartment for connection to a trailer;

all of the operating components of the diesel tractor being positioned beneath the normally horizontally disposed plane extending tangent to the tops of the tire means.

10. The diesel tractor according to claim 9 further including telescoping trailer means connected to the parallel rectangular tubular members of the frame by means of an articulated joint.

* * * * *